April 8, 1930.  H. T. FAUS  1,754,085
ELECTRIC MEASURING INSTRUMENT
Filed Sept. 27, 1928

Inventor:
Harold T. Faus,
by Charles E. Tullar
His Attorney.

Patented Apr. 8, 1930

1,754,085

UNITED STATES PATENT OFFICE

HAROLD T. FAUS, OF LYNN, MASSACHUSETTS, ASSIGNOR TO GENERAL ELECTRIC COMPANY, A CORPORATION OF NEW YORK

ELECTRIC MEASURING INSTRUMENT

Application filed September 27, 1928. Serial No. 308,729.

My invention relates to electric measuring instruments and its main object is to provide a rugged low cost miniature instrument capable of giving good accuracy with a minimum operating current. An example of one application where such an instrument is needed is in the use of voltmeters for radio receiving sets. In order to measure the tube voltages accurately it is essential that the voltmeter take a very small operating current since otherwise the current taken by the voltmeter materially reduces the voltage which it is desired to measure, particularly where batteries and B battery eliminators constitute the source.

Some of the higher grade D'Arsonval instruments might be used, but the cost of such instruments is too great to find extensive application on radio receiving sets. The instrument of my invention, while capable of giving very good measurement accuracy at extremely low operating currents, is less expensive and more rugged than the usual instrument which it is intended to supersede.

In carrying my invention into effect I provide a measuring instrument with a permanent magnet field having a narrow air gap in which a substantially flat moving coil is inserted. By providing a narrow air gap a high density field is provided so that ample torque on the moving coil is produced with small existing currents. The current to the moving coil is preferably conveyed through the bearings where the instrument is intended for use as a voltmeter with small operating currents so that the usual spiral spring connections may be dispensed with. Instead of the usual return spring I prefer to employ a magnetic member on the shaft arranged to operate in the permanent magnetic field to furnish an auxiliary zero restoring torque for the instrument.

Figure 1:
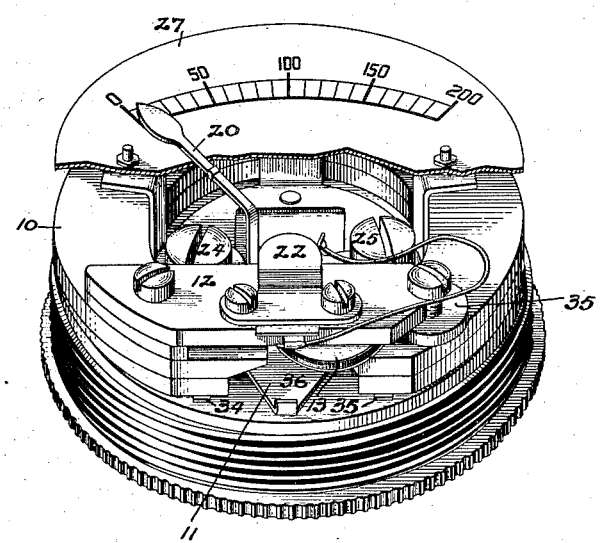
Figure 2:
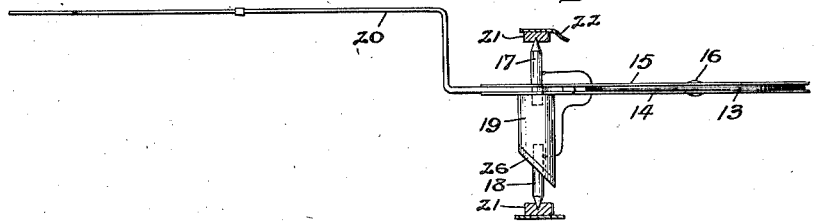
Figure 3:
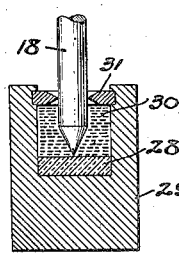
Figure 4:
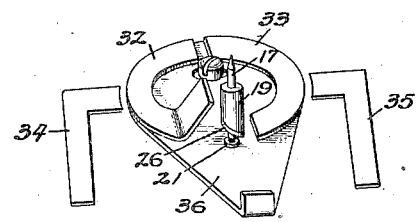

The features of my invention which are believed to be novel and patentable will be pointed out in the claims appended hereto. For a better understanding of the invention, reference is made in the following description to the accompanying drawings in which Fig. 1 is a perspective view of the preferred form of the instrument; Fig. 2 is a side view of the moving element; Fig. 3 is a cross-section through one form of lower bearing which may be employed; and Fig. 4 shows the preferred arrangement for forming a magnetic zero restoring torque.

In Fig. 1 I have represented a voltmeter constructed in accordance with the present invention. The instrument comprises a permanent magnet 10 having an air gap 11. A magnetic pole piece 12 is provided adjacent the air gap which is connected to one pole of the permanent magnet and overhangs the adjacent pole piece so as to provide a narrow air gap across which a relatively high density flux exists. The flat moving coil 13 of the instrument is inserted between the interleaved pole piece members in this narrow air gap. This coil is a pancake coil formed by winding a relatively large number of turns of fine insulated wire on a flat spool having side pieces 14 and 15 made preferably of aluminum and riveted together as indicated at 16 Fig. 2. The inner and outer ends of this coil are connected to the upper and lower pivots 17 and 18 as shown in Fig. 2. These pivots are metallic and are insulated from each other by being secured in a rod 19 of insulating material such as bakelite. The side pieces 14 and 15 of the spool are extended to embrace the shaft of the instrument and may be secured thereto in any suitable manner. This extension also supports the pointer 20 which cooperates with the scale 27. The washer and screw represented at 35 in Fig. 1 are for supporting the end of pole piece 12 and are made of non-magnetic material.

For the small operating current for voltmeters the upper and lower bearings may comprise metal cups 21 made of some such material as phosphor bronze. As represented, the upper bearing is held in place by a spring leaf 22 secured to the pole piece 12. The lower bearing may be rigidly secured to the base plate of the instrument. The spring leaf 22 is adjusted to hold the moving element lightly but firmly in rotative position with the bearing pivots in the depressions of the cup-shaped bearings. A high resistance spool not shown, but preferably mounted in the back of the case is connected in series with the moving coil which is connected through the bearings to the terminals 24 and 25, as represented in Fig. 1. These terminals extend to the back of the case for the circuit connections. For a voltmeter for use with radio sets I have found the following specifications give satisfactory results. The coil 13 may have about 1800 turns and a resistance of about 600 ohms; the resistance in series may be a 50,000 ohm nichrome resistance element. This gives about 1000 ohms per volt drop in the instrument circuit or a current of about $\frac{1}{1000}$ amperes through the instrument on a 50 volt circuit. In spite of this small current through the moving coil, ample torque is produced by reason of the rather intense magnetic field in which the coil is placed. The coil may be connected to move into or out of the permanent magnetic field to produce a measuring deflection. As represented in Fig. 1, it is arranged to be repulsed or to move out of the field when voltage is applied; that is to say, the polarity of the field produced by coil 13 is such as to repel that produced by the permanent magnet so that these fields oppose each other and the coil tends to move sideways to the left out of the narrow air gap. If desired, the instrument may be arranged for both repulsion and attraction and have a zero center scale so that when the current is in one direction through the coil it moves in one direction and when the current is reversed it moves in the opposite direction.

In order that the deflection of the instrument shall be proportional to the current in coil 13 it is necessary to provide a counter torque. This is preferably accomplished by means of an oblong magnetic vane 26 on the shaft located between the poles 32 and 33 of a magnetic diverter represented in Fig. 4. It will be noted that this vane is mounted well outside the influence of the field produced by the armature coil. The source of magnetism for this diverter is the permanent magnet 10 and a small amount of its flux is diverted through magnetic members 34 and 35 which extend beneath the pole tips of the main magnet. The outer ends of these members may be seen in Fig. 1. The pole pieces 32 and 33 are mounted on a non-magnetic plate 36 which may be rotated about the pivot point 21 for the purpose of adjusting the zero setting of the pointer. The amount of flux diverted through the zero restoring vane 26 mounted on the shaft may be accurately adjusted to the correct amount by adjustment of one or more of the air gaps in the path of the diverted flux. That part of the flux of the permanent magnet passing through the magnetic vane tends to move the vane to the position of least reluctance which corresponds to the zero position of the pointer 20. The vane is shaped and proportioned to produce a counter torque substantially proportional to the instrument torque whereby a deflection proportional to the current flowing through coil 13 is produced. This magnetic vane is preferably made of a material which has high permeability and low hysteresis. The material known as permalloy consisting of about 78% nickel and 22% iron which is described in United States Patent 1,586,883 is suitable for this purpose. By reference to this patent it will be noted that this material has a much higher permeability and appreciably lower hysteresis loss than the best magnetic iron. If the strength of the permanent magnet changes, the calibration of the instrument will be but little affected since the permanent magnet flux is a factor in producing both driving and restoring torques. The ordinary return spring may be used, but the magnetic vane is simpler and less apt to get out of adjustment and is unaffected by temperature changes.

In place of metallic cups for bearings I may use the arrangement shown in Fig. 3 where 28 represents a polished stone bearing face held in a metal housing 29. Above the stone 28 the housing contains a small amount of mercury 30 held in place by the washer 31. This may be used for both the bottom and top bearings since the mercury will not work out even if the bearing is inverted. This makes a good electrical contact between the moving and stationary parts of the instrument and should be used where the instrument current is high as in ammeters.

The absence of spiral springs for current leads and return spring is highly advantageous in miniature instruments of the character contemplated because of the difficulty of manufacturing and adjusting fine spiral springs.

Reliable instruments of the form shown in Fig. 1 have been built in about the same proportions as represented with an outside diameter of from 2 to 3 inches.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. In an electric measuring instrument, a stationary field magnet provided with an air gap, a movable armature member in said air gap, and means for producing a zero restoring torque for said armature member comprising a magnetic vane movable with the armature member but mounted outside of the influence of its field together with auxiliary pole pieces for diverting flux from said field magnet through said vane along an axis corresponding to the zero position of the vane, said auxiliary pole pieces being angularly adjustable with respect to the axis of rotation of said armature member to vary the zero setting thereof.

2. An electric measuring instrument comprising a permanent magnet provided with an air gap, a moving coil armature in said air gap, and means for producing a zero restoring torque for said armature comprising a magnetic vane having higher permeability and lower hysteresis than iron, movable with said armature but mounted outside the influence of its magnetic field, and a pair of auxiliary pole pieces for diverting flux from said permanent magnet through said vane, said auxiliary pole pieces being separated from the permanent magnet by air gaps and adjustable about the axis of rotation of said vane for adjusting the zero position of said armature.

In witness whereof, I have hereunto set my hand this 24 day of Sept., 1928.

HAROLD T. FAUS.